United States Patent [19]

Baumann et al.

[11] Patent Number: 4,492,344

[45] Date of Patent: Jan. 8, 1985

[54] FIXTURE FOR A WIRE IN A WIRE-WINDING DEVICE FOR AN ELECTRIC MACHINE

[75] Inventors: Fritz Baumann; Ernst Kränzler; Siegmund Radke, all of Leinfelden-Echterdingen; Rainer Schilling, Stuttgart; Wolfgang Fuchs, Filderstadt; Werner Rieker, Steinenbronn, all of Fed. Rep. of Germany

[73] Assignee: Robert Bosch GmbH, Stuttgart, Fed. Rep. of Germany

[21] Appl. No.: 424,991

[22] Filed: Sep. 27, 1982

[30] Foreign Application Priority Data

Dec. 23, 1981 [DE] Fed. Rep. of Germany ....... 3150970

[51] Int. Cl.³ .............................................. F16C 25/00
[52] U.S. Cl. .................................. 242/1; 242/1.1 R; 310/71
[58] Field of Search ..................... 242/1.1 E, 1.1 R, 1; 29/596; 310/260, 43, 71

[56] References Cited

U.S. PATENT DOCUMENTS 3,189,772 6/1965 Wingler et al. ....................... 310/71
3,979,615 9/1976 Neff ...................................... 310/71
3,984,908 10/1976 Nelson .................................. 310/71

Primary Examiner—Billy S. Taylor
Attorney, Agent, or Firm—Michael J. Striker

[57] ABSTRACT

Fixture for a wire for use in a winding process in a manufacturing of electric machines. The fixture includes a groove-shaped wire-receiving element and is provided with a funnel-like slot extending at an angle to the axis of elongation of the wire-receiving element. The wire end inserted into the wire-receiving element is then guided through the insertion slot.

10 Claims, 5 Drawing Figures

FIXTURE FOR A WIRE IN A WIRE-WINDING DEVICE FOR AN ELECTRIC MACHINE

BACKGROUND OF THE INVENTION

This invention pertains to wire-winding devices for winding electric machines in general, and more particularly to a fixture for a wire.

Fixtures of the type under consideration are known in the art. One of the conventional fixtures is disclosed in DE-AS No. 22 19 764. In this fixture two groove-shaped wire-receiving elements separated one from another are provided. A wire end mechanically inserted in one of those groove-shaped elements is preliminarily clamped therein. The premanufactured wound stator pack can be removed from the winding station of the wire-winding device without loosening the wire end. The end of the wire is then welded to the second wire-receiving element at another production station and then the groove-shaped element, which is no longer needed for clamping the wire end, is cut off. In such a conventional process, however manufacturing expenses are considerably high. Alternatively, the end of the wire must be held by a roller arm and clamped with a hand tool, and to separate the wire end from the wire supply roll or the winding station a mechanical device should be provided. The welding process should be completed also through a device by means of which the groove-shaped wire-receiving element for clamping the wire end can be cut off. When the connection between the welding station and the cutting station is not desired or is difficult to realize, these two production stations are spaced from each other; this requires the provision of an additional transport means and a transport operation accordingly. Further, the conventional process has the disadvantage that the welded wire end is not traction-released. Furthermore, the roughened wire resulted from the welding can be easily broken or ruptured in operation.

SUMMARY OF THE INVENTION

It is an object of the invention to provide an improved fixture for a wire in a wire-winding process.

It is a further object of the invention to provide a fixture which avoids the disadvantages of conventional arrangements of the type under consideration.

These and other objects of the invention are attained by a fixture for use in a wire-winding device for winding electric machines, which is mounted at a front face of a stator pack of the electric machine being manufactured and is insulated therefrom, comprising a connection clip for a wound wire end; and a groove-shaped wire-receiving member provided on said clip for receiving the wound wire end, said wire-receiving member having an axis of elongation, the fixture being formed with an insertion slot extended in front of the wire-receiving member as viewed in a direction of winding of a wire, said insertion slot extending at an angle with respect to said axis of elongation.

The advantage of the fixture according to the invention is that the wire end inserted into the slot and inserted into the groove-shaped wire-receiving element angularly extended with respect to that slot is rigidly clamped. The premanufactured wound stator pack, after the separation of its wire ends from the wire supply roller, can be removed from the winding station without requiring any additional operation. Only a welding operation is thus performed in the process.

According to a further feature of the invention a known per se welding connection is provided between the clip and the wire end, the welding connection being placed into the wire-receiving member.

In one of the modifications of the fixture it can include a lug of synthetic plastic material and having a side surface, said slot being formed between an edge of the clip and said side surface of the lug.

According to another modification of the fixture the latter can include a block-shaped element of synthetic plastic material and formed in the vicinity of the clip, that slot being formed in said block-shaped element.

The block-shaped element may be provided with a projection extended transversally of the slot.

The wire end welded into the groove-shaped element is continuously unloaded there; the wire after its end has been welded to the groove-shaped element is directed at an angle towards the insertion slot and from there it is guided for winding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
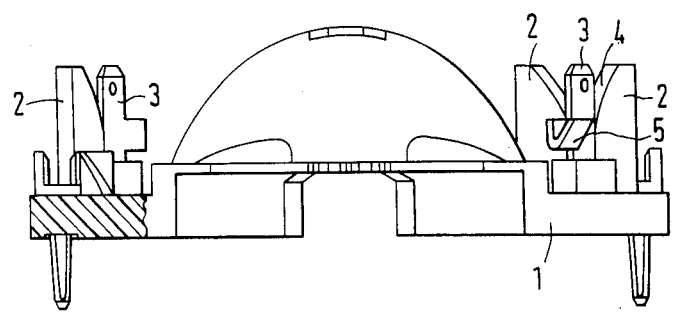
FIG. 1 is a side view partially in section, of an insulating flange for a stator pack, on which a fixture according to the invention is mounted.
Figure 2:
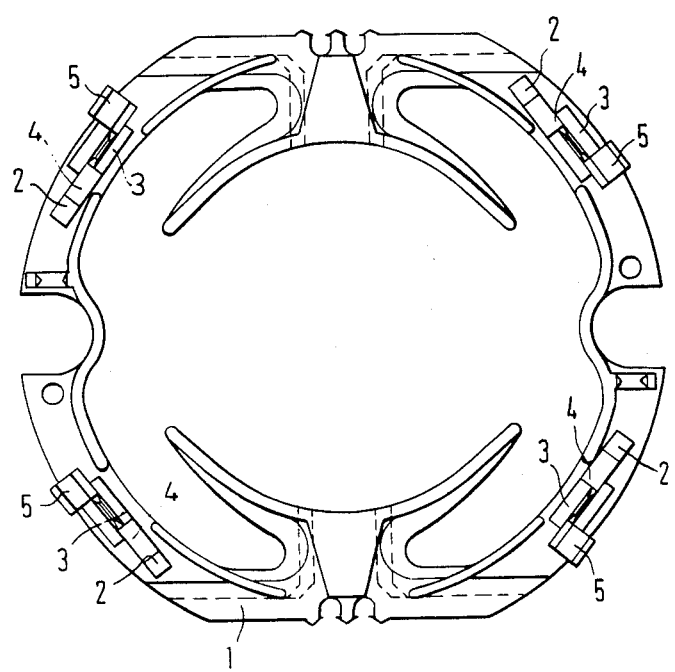
FIG. 2 is top plan view of the insulating flange of FIG. 1.
Figure 3:
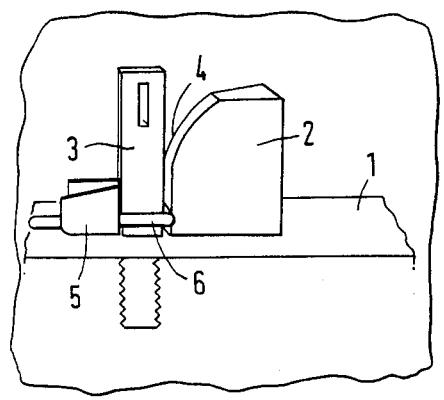
FIG. 3 is an enlarged detailed view of the fixture arrangement in accordance with a first embodiment of the invention.

Referring now to the drawings, and first to FIGS. 1 and 2 thereof, it is seen that an insulating flange 1 for supporting a front side of a stator pack is provided with a number of flaps or lugs 2 formed of synthetic plastic material. As seen in FIG. 2 a number of similar fixtures are spaced from each other circumferentially on the insulating flange 1. In the vicinity of each lug 2 a connection clip 3 is mounted on the flange 1 in such a fashion that an insertion slot 4 is formed between the lug 2 and the respective clip 3. The connection clips 3 are provided with channel-shaped or groove-shaped wire-receiving elements 5 which are arranged so that the base of the groove of each respective element 5 extends at right angle to the corresponding insertion slot 4. As seen in the simplified detailed FIG. 3 a wound wire end 6 is inserted into the slot 4 and the groove-shaped element 5.

Figure 4:
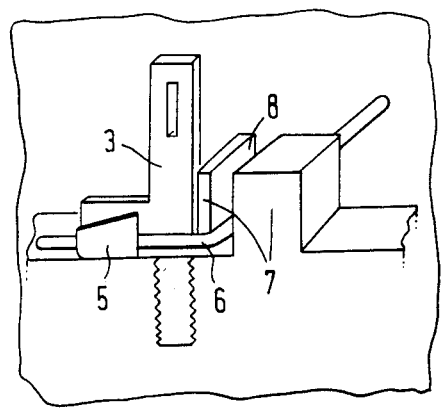
FIG. 4 is an enlarged detailed view of the fixture of another embodiment of the invention.

With reference to FIG. 4 it is seen that lugs 2 can be replaced by blocks 7 made out of synthetic plastic material. Each block 7 which can be formed by extensions of the flange 1 spaced from each other, is provided with the insertion slot 8 which serves the same purpose as slot 4 in the embodiment of FIG. 3. The insertion slot 8 is extended in the same direction as slot 4 of FIG. 3. With so-formed plastic block 7 the winding wire is uncoupled from the connection clip 3 during vibrations occuring in operation. Furthermore, due to the insertion of the wire end 6 into the slot 8 a potential roughening of the wire during unrolling thereof from the supply roll of the wire-receiving element 5 is avoided. The connection of the wire end to the clip 3 is therefore reliable and stable.

Figure 5:
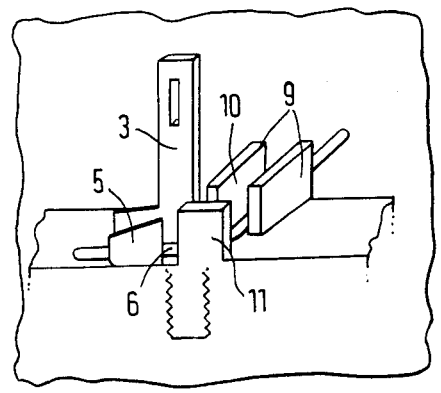
FIG. 5 is an enlarged detailed view of the fixture according to yet another embodiment of the invention.

A further improved modification of the fixture is shown in FIG. 5. In this embodiment a block 9 similar to the block 7 of the embodiment of FIG. 4 and also made out of synthetic plastic material is additionally provided with a projection 11 extending transversally to two parallel extensions of block 9 and projecting in the plane approximately parallel to the plane of the groove of the wire-receiving element 5. In this modification the wire end 6 inserted into slot 10 is reliably held in its bent position, and is even better fused by friction at the projection 11. The funnel-like construction of the insertion slot according to all the embodiments of the invention significantly facilitates the insertion of the wire end thereinto.

The wire-connecting fixture according to the invention is utilized for winding wires for an electric machine, where premanufactured contacts of the wound wire ends are introduced into an automatic winding station. The wire end introduced into the wire-receiving element and into the slot can be connected to the fixture by means of the known per se automatically controlled roller arm, without requiring any additional specific means. After the wire end has been separated from the supply roller the preliminarily wound stator pack is removed from the winding station and is brought to the welding station. A satisfactory contact between the wound wire end 6 and connection clip 3 is conducted at the welding station by welding and clamping them together. The welding connection is traction-relieved due to deflecting the wire from the groove-shaped wire-receiving element 5 into the insertion slot 4, 8, 10. During the welding process no roughening of the wire occurs.

It will be understood that each of the elements described above, or two or more together, may also find a useful application in other types of fixtures for wound wires in a wire winding device for an electric machine differing from the types described above.

While the invention has been illustrated and described as embodied in a fixture for a wound wire device for an electric machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A fixture for use in a wire-winding device for winding electric machines, which is mounted at a front face of a stator pack of the electric machine and is insulated thereform, comprising a connection clip for a wound wire end; a groove-shaped wire-receiving member provided on said clip at its one side for receiving the wound wire end and having an elongated receiving slot for guiding the wire, said receiving slot of said wire-receiving member having an axis of elongation and insertion means provided at the opposite side of said clip and having an elongated insertion slot for inserting the wire, said insertion slot extending at an angle with respect to said axis of elongation for inserting the wire into said elongated insertion slot, then passing the wire to said clip at the angle, and thereafter receiving the wire into said elongated receiving slot.

2. The fixture as defined in claim 1, wherein said wire end is welded to said clip so that a welding connection is formed, said welding connection being positioned in said wire-receiving member.

3. The fixture as defined in claim 2, wherein said insertion means includes a lug of synthetic plastic material and having a side surface, said insertion slot being formed between an edge of said clip and said slide surface of the lug.

4. The fixture as defined in claim 2, wherein said insertion means includes a block-shaped element of synthetic plastic material and formed in the vicinity of said clip, said insertion slot being formed in said block-shaped element.

5. The fixture as defined in claim 4, wherein said block-shaped element is provided with a projection extended transversally of said insertion slot.

6. The fixture as defined in claim 5, wherein said projection has a surface facing said insertion slot, said surface lying in a plane being approximately parallel to a plane in which said wire-receiving member extends.

7. The fixture as defined in claim 1, wherein said insertion slot is funnel-shaped.

8. The fixture as defined in claim 3, wherein said insertion slot is funnel-shaped.

9. The fixture as defined in claim 5, wherein said insertion slot is funnel-shaped.

10. The fixture as defined in claim 1, wherein said insertion slot extends normal to said axis of elongation.

* * * * *